Oct. 26, 1954 K. M. IVERSEN ET AL 2,692,828

METHOD FOR DEEP-ETCHING PRINTING PLATES

Filed Sept. 20, 1951

Inventors:
Knut Mauritz Iversen and
Bjarne Eugen Blandhoel
By: Edward [signature]
Atty Patented Oct. 26, 1954

2,692,828

UNITED STATES PATENT OFFICE 2,692,828

METHOD FOR DEEP-ETCHING PRINTING PLATES

Knut Mauritz Iversen and Bjarne Eugen Blandhoel, Oslo, Norway

Application September 20, 1951, Serial No. 247,414

6 Claims. (Cl. 95—5.7)

Figure 1:
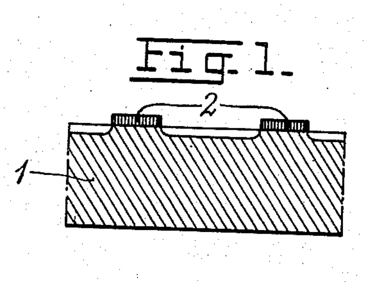

It was formerly known to produce a printing plate in such manner that from the original, i. e. from the object to be reproduced photo-mechanically, first a photographic negative is taken which is then copied upon a metal plate. Upon this plate an enamel layer is obtained which is a positive rendering of lines and areas of the original. Upon this metal plate (the printing plate) the portions located outside the layer must, by a series of etchings, be so lowered that only those portions upon the finished printing plate which represent the original, give a print, whereas the other portions must lie so much lower that they do not reach up to inking rollers and therefore cannot give any print upon a paper. Particularly in the making of line-printing-plates, freely standing autotypi and combined autoline-printing-plates a number of such etchings must be effected in order to obtain a sufficient depth of the lowered portions.

These etchings must be effected stepwise, because e. g. an etchant such as nitric acid upon a metal plate of zinc will certainly not etch directly through the layer but only downwards in the metal areas on the plate which are not covered by the layer, but the acid may during such step etch itself laterally in under the layer so that this may fall off gradually. Consequently the etchings must be of a short duration, and after each etching the plate must be plated with ink and dusted with an asphalt-colophonium powder which then attaches above the layer but also to a certain degree outside its edges.

Particularly after the first etching any adherence of ink and other impurities upon the uncovered places of the layer must be scraped off. By these stepwise etchings and subsequent plating operations it is usually possible, upon 2–4 etchings and platings, to obtain such good protecting edges that—in order to obtain sufficient depth—the printing plate can be subjected to a more extensive etching, the deepetching proper, frequently combined with milling. For the quality of the printing plate it is very important to obtain uniform edges after each plating. After the deep-etching (milling) follow several etchings (round-etchings) to remove the protecting edges, before the printing plate is finally etched.

Figures 1–5 of the drawing show diagrammatically the progress of the known deep-etching.

Figure 2:
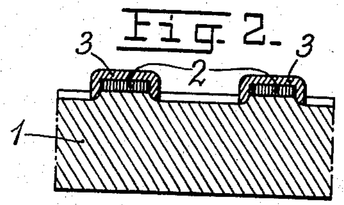
Figure 3:
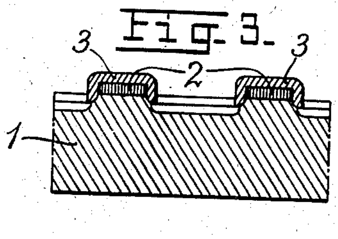
Figure 4:
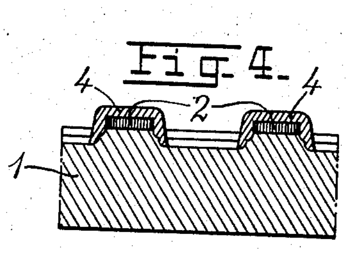

After the copying of the negative upon the light-sensitive (enamel) layer of the metal plate 1 the development is effected. Thereby the unexposed portions of the layer disappear and the remaining portions 2 in Figure 1 represent the original. Then a cautious first etching is effected. The condition is then as Figure 1 shows. Then a plating with asphalt-colophonium powder 3 is made which coats the layer 2 and along its edges down in the base (metal 1) after the first etching as shown in Figure 2. By the second etching which does not attack the covering 3, the base is etched further down but in addition the lower edges of 3 are somewhat under-etched, so that now the condition is as shown in Figure 3. Then a plating is again effected, so that the condition is as shown in Figure 4, where 4 is the covering which now extends along the edges of layer 2 and down in the base after second etching.

Figure 5:
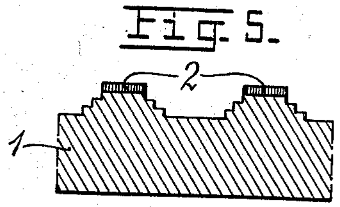

Then the third etching is made and so on. Figure 5 shows the condition before plating is effected for deep-etching. As will be seen, a great number of etchings is required.

Figure 6:
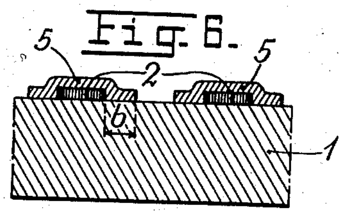
Figure 6A:
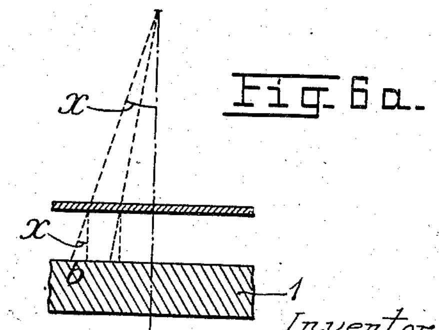

However, it has also been proposed to produce upon the metal plate two image-layers by means of copying-materials consisting of two quite different basic substances. The negative is then copied upon a light-sensitive covering (layer) resistant to the etchant upon a metal plate, usually of zinc or copper which upon development represents the original, whereafter the same negative before the etching is used to copy upon the first covering (layer No. 1) on the metal plate a second covering (layer No. 2) different from the first one and resistant to the etchant in such a manner that covering No. 2 forms protecting edges for lines and areas in the first covering. After development the condition is so shown in Figure 6, where 2 is layer No. 1 and 5 is layer No. 2. The portions of same located outside layer No. 1 are protecting edges. Now a deep-etching is made in one or more steps to the limits of lines and areas of the first covering. By this known method it is intended to produce the protecting edges in the manner that layer No. 2 is copied above layer No. 1 by holding the negative at a certain distance from the second covering which has to form layer No. 2. However the width $b$ of the protecting edges outside layer No. 1 will depend upon the distance between the negative and the second covering and also upon the incident angle $x$ of the copy-light. From this follows that the width $b$ may be highly different on the different points of the covering.

Where the incident angle $x$ between the vertical from the light-source L and the line from same to points on the negative N is small, $b$ will be correspondingly small (Figure 6a). If $x$ is this incident angle and $h$ the height from negative to second covering (copying layer), $b$ will be equal to $h \tan x$. With increasing incident angle $x$, $b$ also will increase correspondingly, so that as $b$ becomes greater, the greater is the distance from the point to the vertical through the light-source. Consequently, an etching may only be made, to an extent allowed by the least edge width *b* on the covering-surface, and the wider edges will remain. For this reason the method has not obtained any practical use.

Figure 7:
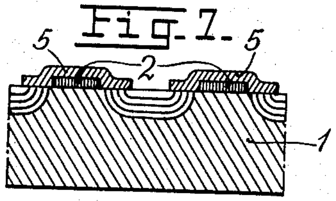
Figure 8:
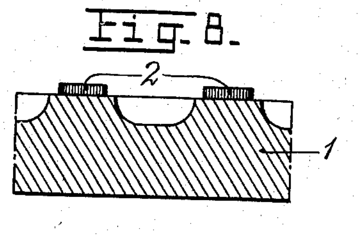
Figure 9:
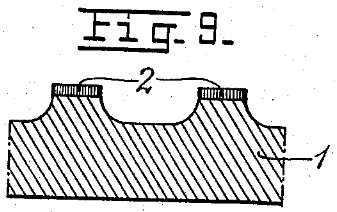

According to the present invention, however, the same edge width *b* is obtained on all points of the copying-layer 5 (second layer). This takes place in the manner that the metal plate or the negative in contact therewith, during the copying of the second covering is subjected to a small parallel-motion along a closed curve relatively to the negative or the metal plate, whereby the second covering is caused to form automatically the said protecting edges with the same width *b* all over. From this appears that so many etchings may be made or a so enduring etching (Fig. 7) as permitted by the width *b* of the protecting edges (which is the same one all over). The result is then as shown in Fig. 8. The final result after the last etching quite inward to layer 2 is shown in Fig. 9.

During the exposure the negative and the metal plate may be stationary relatively to each other whereas the light-source is moved in a closed curve in a plane parallel to both. Or a support for the metal plate is supported by one or more bodies performing an eccentric motion with a small eccentricity. The eccentrically movable body or bodies is or are subjected to a continuous motion by motor drive, and a second covering (layer No. 2) is used which is transparent after development, for instance a paste—or albuminous enamel made light-sensitive.

When layer No. 2 has been formed upon the metal plate, namely upon layer No. 1 having been provided with the said protecting edges, the plate may be subjected at once to the heavy deep-etching, because layer No. 2 extends all over equally beyond layer No. 1 which represents the original proper. This layer No. 2 is also transparent, so that the operator can observe and determine, when the etching should be interrupted, i. e. when the etching commences to approach the edges of layer No. 1. As the edges of the protecting layer (No. 2) fall off according as the etching is advanced under it, an under-etching of the edges on layer No. 1 is prevented. When this deep-etching is completed the rest of layer No. 2 is removed by a solvent liquid which does not dissolve layer No. 1. Usually an edge will remain outside layer No. 1 and this edge may finally be removed by two or three etchings.

In addition to eliminating several etchings and eventual milling, the present method does away with the frequently time-wasting scraping away of remaining plating-ink after the etching, and at the same time is obtained a quite exact rendering of even the most difficult originals. The finished printing plate appears without ununiform edges and visible staircase-steps in the metal along the edges of layer No. 1. Such steps are frequently observed after the several etchings according to previous method. Besides, the new method guarantees against under-etching.

The method may be used also in other connections, where a deep-etching is to be made, for instance in moulds, for casting or vulcanizing rubber articles.

We claim:

1. Method of making a printing plate, comprising the steps of forming a first image from a first coating of light-sensitive, etchant-resistant material on the face of a printing plate by placing a negative in contact with said coating, subjecting the plate to the action of light and developing the plate, applying a second light-sensitive, etchant-resistant coating to said plate of a material different than that of said first coating, placing the negative in contact with said second coating and in registry with the first image, imparting a parallel motion between the plate and the negative along a closed curve while subjecting the plate to the action of light, and developing the plate so as to form a second image which overlies said first image and which has its marginal boundaries of all lines, marks and dots enlarged to the same degree throughout its area so that such enlarged boundaries of the second image extend beyond the margins of the first image, etching the plate until the enlarged boundaries of said second image fall off by being undercut up to close proximity with the edges of the first image, removing the second image with a solvent which does not remove the first image, and then effecting a final etch.

2. Method of making a printing plate, comprising the steps of forming a first image from a first coating of light-sensitive, etchant-resistant material on the face of a printing plate by placing a negative in contact with said coating, subjecting the plate to the action of light and developing the plate, applying a second light-sensitive, etchant-resistant coating to said plate of a material different than that of said first coating, placing the negative in contact with said second coating and in registry with the first image, imparting a parallel motion between the plate and the negative along a closed curve while subjecting the plate to the action of light, and developing the plate so as to form a second image which overlies said first image and which has its marginal boundaries of all lines, marks and dots enlarged to the same degree throughout its area so that such enlarged boundaries of the second image extend beyond the margins of the first image, deep-etching the plate until the enlarged boundaries of the second image fall off by being undercut up to close proximity with the edges of the first image, removing the second image by a solvent which does not remove the first image, continuing the etching up to the edges of the first image, and then effecting the final etching steps.

3. Method according to claim 1, in which the second coating material is transparent after development.

4. Method according to claim 2 in which the second coating material is transparent after development.

5. In a method according to claim 1, moving the negative eccentrically relative to the printing plate in contact therewith so as to provide parallel motion between the plate and the negative.

6. In a method according to claim 2, moving the negative eccentrically relative to the printing plate in contact therewith so as to provide parallel motion between the plate and the negative.

References Cited in the file of this patent

UNITED STATES PATENTS

| Number | Name | Date |
|---|---|---|
| 2,112,416 | Dewberry | Mar. 29, 1938 |
| 2,216,882 | Huggins | Oct. 8, 1940 |
| 2,331,772 | Gibson | Oct. 12, 1943 |

FOREIGN PATENTS

| Number | Country | Date |
|---|---|---|
| 187,343 | Germany | July 20, 1907 |